United States Patent Office 3,518,522
Patented June 30, 1970

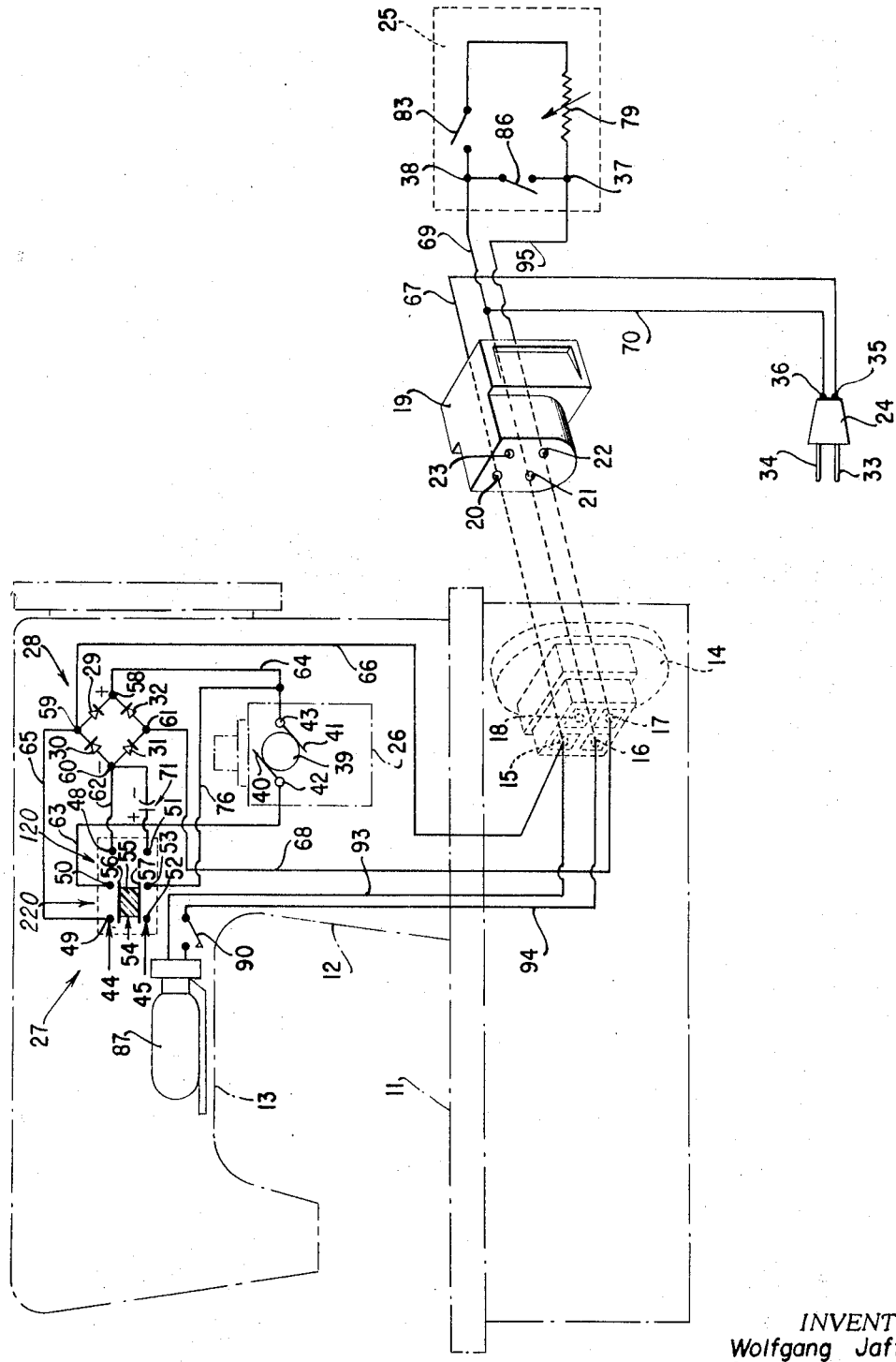

1

3,518,522
DUAL VOLTAGE SPEED CONTROL SYSTEMS FOR D.C. MOTORS SUPPLIED FROM A.C. VOLTAGES
Wolfgang Jaffe, Morristown, and Richard E. Wagoner, Denville, N.J., assignors to The Singer Company, New York, N.Y., a corporation of New Jersey
Filed Jan. 29, 1968, Ser. No. 701,369
Int. Cl. H02p 7/14
U.S. Cl. 318—349      2 Claims

ABSTRACT OF THE DISCLOSURE

A circuit for controlling the speed of a D.C. motor is adapted to be supplied from either high or low A.C. voltages having a voltage ratio of approximately 2 to 1 and employs a bridge rectifier having its input terminals connected to either of the two A.C. voltages in series with an operator-adjustable resistance speed controller. A two-position d.p.d.t. switch connects the D.C. motor to the bridge rectifier so that, in one position of the switch and with the low A.C. voltage applied, full-wave rectified A.C. voltage is applied to the motor and a capacitor is connected in parallel with the motor. In the other position of the switch and with the high A.C. voltage applied, half-wave rectified A.C. voltage is applied to the motor and the capacitor is isolated from the application of any voltage. This circuit provides substantially the same speed versus controller characteristics for either A.C. voltage application and without any internal modification of the motor and/or controller.

BACKGROUND OF THE INVENTION

This invention relates to D.C. electric motors and current distributing switching circuits therefor and more particularly to a motor speed control circuit adaptable to two different line terminal A.C. voltage conditions and to circuit means effective to provide substantially the same speed control performance for said different voltage conditions and without requiring any internal changes in the motor or speed controller.

In the use of electrically driven sewing machines for example, and particularly where such machines are built for sale and use in different countries or different parts of foreign countries it is necessary to compensate in some manner for the place-to-place variations in the A.C. voltage of the domestic electric current supplied to users in the various places.

In the United States, the domestic A.C. voltage supplied has been standardized at 110 volts. However, in the European and Asiatic countries the domestic electric current may be supplied at any number of different A.C. line voltages depending on the locality but most frequently at either 220 or at 120 volts A.C. which is substantially a 2 to 1 ratio.

It is of course possible to supply a special motor and/or a special controller for each voltage encountered, but this is an expensive and inconvenient arrangement because of the large stock inventories required and because it becomes necessary for the sales and service agencies in the various localities to stock and install the special motors and/or controllers as required. It is also possible to provide a motor or a controller which may be manually modified internally by use of tapped or reconnected windings or resistances to suit the voltage condition encountered but this is also an expensive arrangement because of the more complex assembly and field adaption required.

It is therefore among the objects of the present invention to provide simple circuit means including a switch whereby a D.C. motor and a speed controller can be adapted by switching for similar speed control for two different A.C. line voltages having substantially a 2 to 1 ratio and without requiring any internal modification to either the motor or the controller.

SUMMARY OF THE INVENTION

In carrying out the objects of this invention we provide a bridge rectifier, a capacitor, and a d.p.d.t. switch having two positions corresponding respectively to the low and high A.C. line voltages available. Circuitry is provided for connecting the input terminals of the bridge rectifier in series with the adjustable controller resistance and a line plug which latter may be connected to a conventional wall outlet where the different A.C. line voltages are available. The switch, in its low voltage position, connects the D.C. motor to the output terminals of the bridge rectifier and, at the same time, connects a capacitor in parallel with the motor. In this condition, the motor receives full-wave rectified A.C. voltage of a magnitude controlled by the series resistance controller. In the high voltage position of the switch, the D.C. motor is connected to one output terminal and to one input terminal of the bridge rectifier and the capacitor is simultaneously isolated from the application of any voltage thereto. In this condition the motor is placed in series circuit relation with but one of the leg rectifiers of the bridge and receives half-wave rectified A.C. voltage of a magnitude controlled by the series resistance controller.

The single figure of the drawings is a schematic wiring diagram of a system illustrating an embodiment of the invention as applied to an electrically driven sewing machine.

DESCRIPTION OF THE PREFERRED EMBODIMENT

With reference to the drawings, the dual voltage motor speed control system of the present invention is shown embodied in a sewing machine having a frame including a work supporting bed 11, a hollow standard 12 rising from one end of the bed, and a bracket arm 13 at the top of the standard overhanging the bed. A receptacle 14 having first, second, third and fourth prongs 15, 16, 17 and 18 is mounted in the standard end of the bed to receive a mating detachable plug 19 having first, second, third and fourth contacts 20, 21, 22 and 23 corresponding to the first, second, third and fourth prongs of the receptacle.

The motor dual voltage control system of the invention includes the following elements: a plug 24 for connecting to a conventional wall outlet where either approximately a 120-volt or approximately a 220-volt source of A.C. voltage is available, a motor speed controller in the form of a conventional foot controller 25, a D.C. motor 26 of the permanent magnet type mounted in the hollow standard, a double-pole, double-throw switch 27 mounted in the top of the standard in a position available to the operator, and a bridge rectifier 28 having four legs, each leg including a single half-wave rectifier in the form of first, second, third and fourth diodes 29, 30, 31 and 32, mounted also in the top of the standard.

The plug 24 has first and second prongs 33 and 34 and first and second terminals 35 and 36 corresponding to the first and second prongs. The foot controller 25 has first and second terminals 37 and 38. The motor has an armature 39, first and second brushes 40 and 41, and first and second terminals 42 and 43 corresponding to the first and second brushes. The double-pole, double-throw switch 27 has first and second poles 44 and 45. The first pole of the switch has stationary contacts 48 and 49, and a center contact 50. Correspondingly, the second pole of the switch has stationary contacts 51 and 52, and a center contact 53. A sliding member 54 is sandwiched between the first and second poles of the switch. The sliding member has an insulator 55 sandwiched between first and second conducting contacts 56 and 57 corresponding to the first and second poles of the switch. The bridge rectifier 28 has input terminals 59 and 61 and output terminals 58 and 60 of the polarity shown.

The elements of the motor dual voltage speed control circuit are electrically interconnected in the following manner. A lead 62 is connected between the output terminal 60 of the rectifier and contact 48 of the switch. A lead 63 is connected between the center contact 50 and the terminal 42 of the motor. A lead 64 is connected between the terminal 43 of the motor and the output terminal 58 of the rectifier. A lead 65, is connected between the input terminal 59 of the rectifier and the contact 49 of the switch.

A lead 66 is connected between the input terminal 59 of the bridge rectifier 28 and prong 15, thence through receptacle 14 and plug 19 and by way of lead 67 to the first terminal 35 of the plug 24. A lead 68 is connected between the input terminal 61 of the rectifier and prong 17, thence through receptacle 14 and prong 19 and by way of lead 95 to terminal 37 of the foot controller. A lead 69 is connected between the terminal 38 of the foot controller to contact 21 of the plug 19 and thence by way of lead 70 to the terminal 36 of the plug 24. A lead 76 is connected to the center contact 53 of the switch and joins the lead 64 as shown. A capacitor 71 is connected between the output terminal 60 of the rectifier 28 and contact 51 of the switch 27.

The foot controller 25 is conventional and internally has a variable resistor 79 connected in series circuit with a switch 83, said series circuit being connected across terminals 37 and 38. A normally-open switch 86 is also connected across the terminals 37 and 38 to provide zero resistance when the controller is fully depressed to obtain maximum speed.

A lamp 87 having a series switch 90 is connected by leads 93 and 94 thence through receptacle 14 and plug 19 to the plug 24. While this lamp and the circuit therefor form no part of the present invention, it is shown here merely to complete the practical electrical environment for the embodiment shown and it will be understood that the voltage ratings of the lamp 87 must be selected to suit the A.C. voltage of the outlet to which the plug 24 is connected.

For operation in which the plug 24 is connected to an outlet where 120 volt A.C. voltage is available, the sliding member 54 is placed in its low voltage position marked "120" which is to the right as viewed in the drawing. In this position, the contacts 48 and 50 are bridged by the conducting contact 56 and the contacts 51 and 53 are bridged by the conducting contact 57. This places the motor armature 39 in series with the output terminals 58 and 60 of the rectifier 28 through leads 62, 63 and 64, and, when the foot controller 25 is actuated to close switch 83, the motor armature 39 will receive full-wave rectified A.C. current of a magnitude controlled by the foot controller. Further, in this low voltage position of the sliding member 64, it will be seen that the capacitor 71 is connected in parallel with the motor armature 39.

For operation in which the plug 24 is connected to an outlet where 220 volt A.C. voltage is available, the sliding member 54 is moved to its high voltage position marked "220" which is to the left as viewed in the drawing. In this position, the contacts 49 and 50 are bridged by the conducting contact 56 and the contacts 52 and 53 are bridged by the conducting contact 57. This places the motor armature 39 in series with the output terminal 58 and the input terminal 59 of the rectifier 28 through leads 63, 64 and 65. In this condition current can be supplied to the armature 39 only through the single diode 32 and then only on the half waves of the A.C. voltage when terminal 61 is positive with respect to terminal 59. The diode 29 operates in this circuit as a conventional free-wheeling diode connected in parallel with the motor armature 39. Thus, in the high voltage position of the switch 27, the armature will receive half-wave rectified A.C. current of a value controlled by the foot controller 25. It is important to note that in this condition of the circuit the electrolytic capacitor 71 is completely isolated from the application of any voltage by the open circuit created in the gap between contacts 51 and 53. This removes any stress on the dielectric of the capacitor 71 when not in actual use and contributes greatly to the longer useful life and greater reliability of this inexpensive component.

From the above it will be seen that, according to this invention, a bridge rectifier, a capacitor and a switch, all of which are inexpensive and conventional components, are arranged in a novel circuit to provide a speed control system for a D.C. motor which can be instantly adapted, by merely selecting one of two switch positions, for effective operation from either of two A.C. source voltages having a ratio of substantially 2 to 1 and without requiring any internal circuit modifications to the motor or the speed controller.

Although the invention has been described in its preferred form with a certain degree of particularity, it is understood that the present disclosure of the preferred form has been made by way of example and that numerous changes in the details of construction and the combination and arrangement of parts can be restored to without departing from the spirit and the scope of the invention.

We claim:

1. A system for controlling the speed of a D.C. motor over a range of speeds, which range is substantially the same whether said system is supplied from either one or the other of two A.C. voltage sources having relative voltage magnitudes of approximately 2 to 1, comprising a speed controller having an adjlstable resistance, a bridge rectifier having two input and two output terminals, a capacitor, a single switch having first and second operative positions, means connecting said two input terminals in series circuit with the adjustable resistance, means adaptable to connect said series circuit to be energized from either of said voltage sources, said switch in its first position connecting said motor and said capacitor in parallel relation and together in series relation to the output terminals of the bridge rectifier and said switch in its second position connecting said motor in series relation with one of said output terminals and one of said input terminals and at the same time isolating the capacitor from the application of any voltage, said first switch position corresponding to the condition of the system in which the A.C. voltage solrce has the lower voltage magnitude.

2. The system according to claim 1, wherein the bridge rectifier comprises four diodes and in one position of the switch, only one of said diodes is effective in supplying current to the motor, a second diode being connected in parallel with the motor as a free-wheeling diode.

References Cited

UNITED STATES PATENTS 3,309,544    3/1967    Lawson    307—146
3,416,059    12/1968    Lagier    318—514 X ORIS L. RADER, Primary Examiner H. HUBERFELD, Assistant Examiner U.S. Cl. X.R.

307—146; 318—442, 500